Sept. 20, 1955    C. A. CHAPMAN    2,718,419
BEARING ADJUSTING MEANS FOR STEERING IDLER ARMS
Filed April 4, 1952
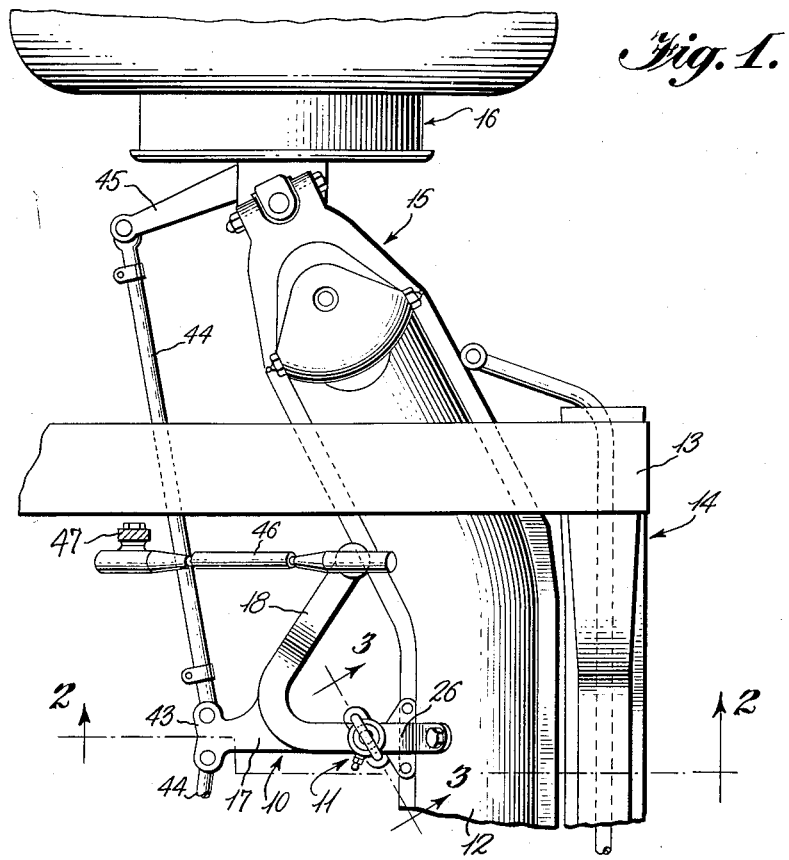
INVENTOR
Clyde A. Chapman
BY Mason, Fenwick, & Lawrence
ATTORNEYS

United States Patent Office 2,718,419
Patented Sept. 20, 1955

2,718,419

BEARING ADJUSTING MEANS FOR STEERING IDLER ARMS

Clyde A. Chapman, Brunswick, Ga.

Application April 4, 1952, Serial No. 280,515

6 Claims. (Cl. 287—100)

The present invention relates in general to steering idler couplings for automobiles, and more particularly to adjustable couplings for automobile steering idlers designed to permit adjustment to compensate for wear and prevent rattling in the steering assembly.

Heretofore, a particularly bothersome problem in design of steering idlers of automobiles has been the provision of coupling between the steering idler of the knuckle arm tie rods, the chassis and the steering link, which will avoid or substantially reduce the rattling. The steering idler is usually pivotally coupled to the front suspension cross member of the automobile by means of a bracket and bolt arrangement with the steering idler extending rearwardly from this coupling and pivotally coupled with tie rods extending to the steering knuckle arm of each wheel. A steering third arm extends at an arcuate angle relative to the main arm of the steering idler and is pivotally coupled to a steering link which in turn is coupled to a pitman arm and a steering gear controlled by the steering wheel of the automobile. The steering idler depends for support on its pivotal coupling with a supporting bracket bolted to the front suspension cross member.

This pivotal coupling between the steering idler and its supporting bracket bolted to the front suspension cross member conventionally consists of rearwardly extending bifurcated yoke arms on the supporting bracket adapted to receive a cylindrical tubular head on the forward end of the main arm of the steering idler. Vertical bores are formed in the yoke in registry with the bore in the head and a steering bracket pin is projected through these registering bores and held in place by a cross pin extending on a horizontal axis through the steering idler head.

Because the steering arm is in constant movement during operation of the automobile due to vibration transmitted to the steering idler through the steering knuckle arms and tie rods, this steering idler coupling is subject to tremendous wear and vibration. To alleviate this wear and reduce friction within the steering idler coupling, spacer washers are often provided between the faces of the steering idler head and the yoke arms of the supporting bracket. However, the steering idler third arm carries a great amount of weight which produces a downward pressure on the spacer washers between the steering idler head and the lower yoke arm of the supporting bracket, causing considerable wear on this washer. Because of the considerable weight bearing on the steering idler third arm, this wear begins to show at relatively low mileage.

After this wear occurs, the steering idler will tend to ride up and down, allowing water and grit to work into the moving parts of the coupling and cause greater wear. When the moving parts of the coupling become worn through these various forces, the automobile tends to weave when in operation, producing road shock and loose steering, as well as undesirable noise and vibration in the automobile. Prior to the development of the present invention, the only way to overcome this excessive wear in the steering idler coupling was to replace the worn parts whenever wear began to appear.

An object of the present invention, therefore, is the procision of a novel coupling for automobile steering idler arms which eliminates the above-described disadvantages.

Another object of the present invention is the provision of a novel coupling for automobile steering idler arms which is adjustable to eliminate play and wear in the steering idler supporting bracket, bushings and pin assembly.

Another object of the present invention is the provision of a novel coupling for steering idler arms which is readily adjustable to compensate for wear between the moving faces of the components of the coupling assembly.

Another object of the present invention is the provision of a novel coupling for automobile steering idler arms which substantially prevents rattling in the automobile steering assembly.

Other objects, advantages and capabilities of the present invention will become apparent from the following detailed description taken in conjunction with the accompanying drawings wherein only a preferred embodiment is shown.

In the drawings:

Figure 1 is a top plan view of a steering idler assembly embodying the present invention illustrated in operative relationship with associated components of an automobile;

Figure 2 is a vertical transverse section taken along the lines 2—2 of Figure 1;

Figure 3 is a vertical section through the steering idler coupling embodying the present invention taken along the lines 3—3 of Figure 1; and Figure 4 is a horizontal section taken along the lines 4—4 of Figure 3.

The present invention relates particularly to a novel coupling for connecting the main steering idler arm of a steering idler assembly to the supporting bracket which is conventionally bolted to the front suspension cross member of the automobile. The coupling embodying the present invention involves a unique design which permits vertical adjustment of the steering bracket pin to which the tubular head of the main steering idler arm is locked to properly distribute wearing forces between the steering bracket pin and the yoke arms of the bifurcated supporting bracket, and between the faces of the main steering idler arm head and the lower yoke arm of the bifurcated supporting bracket. Additionally, a clamp extends around the bracket to permit adjustment between both faces of the steering arm head and both yoke arms of the bifurcated supporting bracket. In this manner, complete control of the spacing between the various moving faces of the components of the coupling is provided so that full compensation for wear along these facings may be made, eliminating the necessity for replacement of parts.

The present invention will be more fully understood from the following description, referring particularly to the drawings, wherein like reference characters designate corresponding parts throughout the several figures thereof. Referring to Figure 1 of the drawings, there is illustrated a conventional steering idler assembly indicated in general by the reference character 10, having the novel anti-rattler steering idler coupling indicated by the reference character 11. As indicated in the drawings, this steering idler assembly 10 is adapted to be fixedly mounted at the center of the front suspension cross member 12 of the automobile which in turn is fixed on an axis disposed transverse to the longitudinal axis of the side members 13 of the automobile chassis 14, the front suspension having the conventional front end wheel coupling 15 for pivotally coupling the wheel hub and brake drum 16 at each end of the front suspension cross member.

The steering idler assembly 10, as is clearly illustrated in Figures 1 and 2, consists of the main steering idler arm 17, which is normally disposed in alignment with the longitudinal axis of the automobile having a steering third arm 18 integrally formed thereon and extending laterally therefrom forming an angle of approximately 60° with the main steering idler arm. The forward end of the main steering idler arm 17 is provided with an enlarged head 19 of cylindrical form. The head 19 is provided with a vertical bore 20 extending therethrough adapted to receive a vertical steering bracket pin 22 and a horizontal bore 21 adapted to receive the cross pin 23.

This steering idler arm head 19 is adapted to be received in the recess between a pair of yoke arms 24 and 25 of the supporting bracket 26, which in turn is provided with a pair of forwardly extending flanges 27 adapted to overlie portions of the front suspension cross member 12 and be bolted thereto as by bolt 27'.

The yoke arms 24 and 25 are each provided with vertical bores 24' and 25', respectively, registering with the bore 20 of the main steering idler arm head 19 to receive the steering bracket pin 22 and pivotally support the steering idler arm assembly 10 relative to the front suspension cross member 12. It will be noted from Figure 3 of the drawing that the bore 24' of the upper yoke arm 24 is provided with a sleeve bushing 28 to reduce friction between the upper sides of the steering bracket pin 22 and the sides of the bore 24', and with a disc bushing 29, which is held in place within the bore 24' by striking over of the upper edges of the bore, as indicated at 30.

The sleeve bushing 31 is provided in the bore 25' of the lower yoke arm 25 to prevent lateral play between the steering bracket pin 22 and the lower yoke arm 25. It will also be noted from the drawings that a spacer washer 32 is provided between the lower face of the steering idler arm head 19 and the lower yoke arm 25 to reduce friction between the opposing faces of these two components.

A clamp 33 is provided for this coupling to compensate for wear between these moving components of the coupling, which consists of a clamp plate 34 formed of steel or other suitable stress-resistant material which is of greater width than the yoke arms 24 and 25 and is disposed against the face of the lower yoke arm 25. This clamp plate 34 is provided with a cylindrical projection 35 adapted to seat in a complementary recess formed in the lower end of the lower yoke arm 25 with a threaded aperture 36 extending vertically through the center of the clamp plate 34 in alignment with the medial axis of the steering bracket pin 22. A set screw 37 is disposed in the threaded aperture 36 of the clamp 34 with its inner end bearing against the lower end of the steering bracket pin 22 and having a lock nut 37' thereon to hold the same in adjusted position.

A pair of apertures 38 are likewise formed in the plate 34 outwardly of the yoke arms 24 and 25 adapted to receive the arms of a U-shaped bracket 39. The bridge 40 of this U-shaped bracket 39 bears against the upper surface of the upper yoke arm 24, while the arms 41 extend downwardly alongside the other components of the coupling with the threaded ends 41' of the arms of the U-shaped bracket intercoupled with threaded nuts 42 bearing against the lower face of the clamp plate 34.

The rearmost end of the main steering idler arm 17 is provided with a pair of laterally projecting flanges 43 pivotally intercoupled with tie rods 44, which in turn are pivotally coupled with steering knuckle arms 45 to reflect turning of the wheel hubs.

The end of the steering third arm 18 is pivotally coupled to one end of a linkage indicated generally at 46, the other end of which is pivotally coupled to the pitman arm 47 extending from and rotated in a vertical plane by the steering gear in the conventional steering gear housing (not shown).

The cross pin 23, in accordance with conventional practice, extends through the steering arm head 19 on a horizontal axis spaced off-center from the axis of the head and through a complementary recess in the steering bracket pin 22, so as to positively tie the steering bracket pin 22 to the main steering idler arm.

It will be apparent that on operation of the automobile, the shocks will be transmitted from the wheel hubs 16 through the steering knuckle arms 45 and tie rods 44 to the steering idler arm 17, tending to cause wear between the moving faces of the components of the coupling 11. Further, the weight of the steering components coupled to the steering idler third arm 18 tend to rotate the steering idler relative to the coupling 11 both in vertical and horizontal planes and begins to cause wear on the spacer washer 32 disposed between the main steering arm head 19 and the upper face of the lower yoke arm 25. Further, the torsional forces on the steering idler arm and road shocks transmitted through the steering knuckle arms and tie rods likewise create wear at the upper face of the main steering idler arm head 19 and between the steering bracket pin 22 and the sleeve bushings 28 and 31 in the yoke arms 24 and 25, respectively.

Wear at these points can be readily compensated for with the novel coupling herein disclosed. By adjusting the nuts 42 on the threaded ends 41' of the U-shaped bracket 39, the yoke arms 24 and 25 bearing against the bridge 40 of the bracket 39 and the clamp plate 34, respectively, will be forced together to effect the desired degree of spacing between these components.

By then adjusting the set screw 37 within the threaded aperture 36 of the clamp plate 34, the steering bracket pin 22 may be positioned at any desired point vertically within the bores of the yoke arms 24 and 25, thus spacing the upper and lower faces of the main steering idler arm head 19 equal distances from the opposing faces of the front lower yoke arms 24 and 25. This causes the vertical position of the head 19 on the steering bracket pin 22 to be fixed by the cross pin 23.

In this manner, all wear occurring between the moving parts of the steering idler coupling may be accurately compensated for as many times as such adjustment is required, maintaining the parts always accurately spaced relative to each other and preventing torsional play of the steering third arm to prevent transmission of road shocks to the automobile, to maintain tight steering characteristics, and to eliminate noise and rattle in the steering mechanism.

While but one embodiment of the present invention has been particularly shown and described, it is distinctly understood that the invention is not limited thereto, but that various modifications may be made within the spirit and scope thereof, and it is desired therefore that only such limitations shall be placed thereon as are imposed by the prior art and are set forth in the appended claims.

What is claimed is:

1. In an automobile steering idler assembly of the type including a steering idler arm having a tubular head pivotally coupled between the arms of a bifurcated supporting bracket by means of a vertically arranged pin fixed to said head and extending through registering bores in said head and arms, an adjustable bracket for adjusting the spacing between the components of the pivotal coupling having a pair of bearing surfaces in abutment with the opposite faces of said bracket arms, adjustable means intercoupling said bearing surfaces for drawing the bracket arms in abutment therewith toward each other and adjusting the spacing between said tubular head and both of said bracket arms, and adjustable means projecting from one of said bearing surfaces through the bore of the lowermost of said bracket arms and supporting the lower end of said pin for determining the spacing between the lower face of said head and said lower bracket arm.

2. In an automobile steering idler assembly of the type including a steering idler arm having a tubular head pivotally coupled between the arms of a bifurcated supporting bracket by means of a vertically arranged pin fixed to said head and extending through registering bores in said head and arms, a clamping bracket for adjusting the spacing between the components of the pivotal coupling comprising a pair of bearing elements in abutment with the opposite faces of said bracket arms, adjustable means intercoupling said bearing elements for drawing the bracket arms in abutment therewith toward each other and adjusting the spacing between said tubular head and both of said bracket arms, and adjustable means projecting from one of said bearing elements through the bore of the lowermost of said bracket arms and supporting the lower end of said pin for determining the spacing between the lower face of said head and said lower bracket arm.

3. In an automobile steering idler assembly of the type including a steering idler arm having a tubular head pivotally coupled between the arms of a bifurcated supporting bracket by means of a vertically arranged pin fixed to said head and extending through registering bores in said head and arms, a clamping bracket for adjusting the spacing between said tubular head and said arms comprising a pair of bearing elements in abutment with the opposite faces of said bracket arms, adjustable means intercoupling said bearing elements for drawing the bracket arms in abutment therewith toward each other and adjusting the spacing between said tubular head and both of said bracket arms, and means threadedly intercoupled in one of said bearing elements and projecting therefrom through the bore of the bracket arm abutting said one bearing element for supporting the lower end of said pin and determining the spacing between said head and bracket arm abutting said one bearing element.

4. In an automobile steering idler assembly of the type including a steering idler arm having a tubular head pivotally coupled between the arms of a bifurcated supporting bracket by means of a vertically arranged pin fixed to said head and extending through registering bores in said head and arms, a clamping bracket for adjusting the spacing between said tubular head and said bracket arms comprising a bearing plate abutting the lowermost of said bracket arms, an extension element projecting from said bearing plate having an arm embracing the uppermost of said bracket arms, means adjustably intercoupling said extension element to said bearing plate for varying the spacing between said extension arm and said bearing plate and drawing said bracket arms towards each other, and means threadedly mounted in said bearing plate and projecting into the bore of said lowermost bracket arm into abutment with the end of said bracket pin disposed therein for supporting said pin and determining the spacing between the lower face of said head and said lower bracket arm.

5. In an automobile steering idler assembly of the type including a steering idler arm having a tubular head pivotally coupled between the arms of a bifurcated supporting bracket by means of a vertically arranged pin fixed to said head and extending through registering bores in said head and arms, a clamping bracket for adjusting the spacing between said tubular head and said bracket arms comprising a bearing plate abutting the lower surface of the lowermost of said bracket arms, a U-bolt extending through apertures in said bearing plate having a bridge embracing the upper surface of the uppermost of said bracket arms, threaded means on the ends of said U-bolt bearing against said bearing plate for varying the spacing between said bridge and said bearing plate and drawing said bracket arms toward each other for varying the spacing between said arms and said tubular head, and set screw means threadedly mounted in said bearing plate and projecting into the bore of said lowermost bracket arm into abutment with the lower end of said bracket pin to support said pin and determine the spacing between the lower face of said head and said lower bracket arm.

6. In an automobile steering idler assembly of the type including a steering idler arm having a tubular head pivotally coupled between the arms of a bifurcated supporting bracket by means of a vertically arranged pin fixed to said head and extending through registering bores in said head and arms, a clamping bracket for adjusting spacing between said tubular head and said bracket arms comprising a bearing plate abutting the lowermost of said bracket arms, a bolt threadedly coupled with said bearing plate having an arm embracing the uppermost of said bracket arms, said threaded intercoupling varying the spacing between the arm of said bolt and said bearing plate for drawing said bracket arms toward each other and varying the spacing between said tubular head and both of said bracket arms, and set screw means threadedly mounted in said bearing plate and projecting into the bore of said lowermost bracket arm into abutment with the lower end of said bracket pin to support said pin and determine the spacing between the lower face of said head and said lower bracket arm.

References Cited in the file of this patent

UNITED STATES PATENTS

| | | |
|---|---|---|
| 220,696 | Blue | Oct. 21, 1879 |
| 549,801 | Lockwood | Nov. 12, 1895 |
| 1,576,329 | Jacques | Mar. 9, 1926 |
| 2,242,215 | Johnson | May 20, 1941 |
| 2,620,202 | Coleman | Dec. 2, 1952 |